(12) United States Patent
Robertson et al.

(10) Patent No.: US 8,345,158 B2
(45) Date of Patent: Jan. 1, 2013

(54) MERGING VIDEO WITH TIME-DECIMATED HIGH-RESOLUTION IMAGERY TO FORM HIGH-RESOLUTION VIDEO FRAMES

(75) Inventors: Mark Robertson, Cupertino, CA (US); Ming-Chang Liu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1297 days.

(21) Appl. No.: 12/053,443

(22) Filed: Mar. 21, 2008

(65) Prior Publication Data

US 2009/0238535 A1    Sep. 24, 2009

(51) Int. Cl.
  *H04N 7/01* (2006.01)
  *H04N 11/20* (2006.01)
(52) U.S. Cl. .................................. 348/459; 348/452
(58) Field of Classification Search .......... 348/448–452, 348/458, 459, 441, 443
  See application file for complete search history.

(56) References Cited

U.S. PATENT DOCUMENTS

| | | | | |
|---|---|---|---|---|
| 5,430,490 A | * | 7/1995 | Rim | 348/452 |
| 6,037,988 A | * | 3/2000 | Gu et al. | 375/240.16 |
| 7,262,818 B2 | * | 8/2007 | Chuang et al. | 348/790 |

* cited by examiner

*Primary Examiner* — Michael Lee
(74) *Attorney, Agent, or Firm* — John P. O'Banion

(57) ABSTRACT

Apparatus and methods for generating a shutter-time compensated high spatial resolution (HR) image output by enhancing lower spatial resolution (LR) video images with information obtained from higher spatial resolution still images which are temporally decimated. Super-resolved images and LR SAD information is generated from the LR images and used for directing the extracting of information from the temporally decimated HR images to enhance the spatial resolution of the LR images in a blending process. By way of example blending can comprise: motion estimation, motion compensation of a temporally displaced HR still images and a super-resolved (SR) image input, transformation (e.g., DCT), generating motion error output, blending motion compensated images in response to LR motion error information; inverse-transformation into a shutter-time compensated HR video image output. Accordingly, a more cost effective solution is taught for obtaining a desired shutter time and video resolution.

23 Claims, 4 Drawing Sheets

$LR_x$ is low-resolution video picture, $x=0$, $n-1$, or $N$
$HR_x$ is high-resolution still for $x=0$ or $N$
$SR_n$ is the super-resolved video picture
$STC_{n-1}$ is the previous STC output

MERGING VIDEO WITH TIME-DECIMATED HIGH-RESOLUTION IMAGERY TO FORM HIGH-RESOLUTION VIDEO FRAMES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to the creation of high resolution video, and more particularly to the merging of low-resolution video with temporally decimated high-resolution still images to create a high-resolution video output.

2. Description of Related Art

The creation of apparatus and methods for simplifying creation of high definition (high resolution) content has become increasingly important. In particular this importance is especially profound in view of recent changes which make high definition video content the standard for video streams.

Conventional mechanisms for generating high-resolution content require the use of imaging systems that have a pixel resolution equivalent to the desired resolution of the output video. It will be recognized that although this produces a desirable video output stream with a minimum of artifacts, it represents a high-cost solution which is not suitable for all applications.

Recently, work has been put forth toward combining multiple lower-resolution images into frames of a higher-resolution image stream or video. These techniques have shown some promise, yet suffer from a number of shortcomings. In creating the higher-definition images, noise by way of high frequency artifacts, are often introduced into the video. In some cases, the artifacts introduced can be as annoying to a viewer as watching the original low-resolution video.

Accordingly, a method is needed for producing low noise, high spatial definition video, without the need of video equipment whose native resolution equals that of the desired output. The present invention fulfills that need, as well as others, and overcomes deficiencies of previously proposed solutions.

BRIEF SUMMARY OF THE INVENTION

A high spatial resolution video image output is generated in response to registering a low spatial resolution (LR) video image source and intermittent still images having a high spatial resolution (HR) which are processed and blended to create a video image stream having a spatial resolution exceeding the LR video image source. The high resolution output approximates that which would arise if the intermittent HR images were coincident in time with the frames being output by the method. According to this method a high resolution video output can be generated without the need of a video imager which provides both high spatial and temporal dimensions.

The term "resolution" as applied to images typically refers to spatial resolution, whereby if text herein does not specify "temporal resolution" or "spatial resolution", then it can be considered to refer to spatial resolution in the common context of the word resolution. It will be noted that the terms "high-resolution" and "high-definition" are both directed at spatial resolution aspects. One of ordinary skill in the art will recognize that spatial resolutions are generally stated as a number of vertical and horizontal rows of pixels (e.g., 800× 600, 1024×768, 1280×720, 1920×1080 and so forth), or as a number of pixels in the frame. Furthermore, those skilled in this area of art will recognize that temporal resolution regards the image rate, or period between images, such as given by the number of frames per second within the image stream.

The system of the present invention is configured for merging lower spatial resolution video with time-decimated (intermittent and/or sparse in the time domain) still image input having a high spatial resolution to generate a video output having a higher spatial resolution than the video input, and a higher temporal resolution than the still images.

Picture blending techniques are described for generating additional high spatial resolution images which are temporally displaced from the original high spatial resolution still images and enhancing the content of the lower spatial resolution video frames. Preferred processing steps include the use of the following (described in detail in the specification): motion estimation, motion refinement, motion compensation, low resolution sum of absolute different (LR SAD) determination, discrete cosine transforms (DCTs), blending to create a high resolution image output, and inverse discrete cosine transforms (IDCTs).

The invention is amenable to being embodied in a number of ways, including but not limited to the following descriptions.

At least one implementation of the invention is a method of generating a high spatial resolution video image output, comprising: (a) receiving a first image source comprising video images of a first spatial and temporal resolution; (b) receiving a second image source comprising still images of a second spatial and temporal resolution, wherein the first temporal resolution exceeds the second temporal resolution, while the second spatial resolution comprises a high spatial resolution which exceeds the first spatial resolution; (c) receiving super-resolved (SR) images within an SR signal, the SR signal resulting from processing one or more lower resolution video images according to a super-resolution or interpolation process which does not utilize images from the second image source; and (d) generating a high spatial resolution video image output in response to transform-domain blending between the SR signal and motion compensation of the second image source, with the blending performed in response to a measure of motion estimation error. It will be appreciated that the video image output is preferably configured for ultimately being viewed on a display screen, wherein it provides a higher spatial resolution than the lower resolution video frames being received. In addition, it will be recognized that the video image output need not be directly displayed on a video screen, and need not be formatted for immediate display as it may be communicated over networks (e.g., the Internet), stored for later retrieval, received by another system or systems, and/or utilized in other ways in a manner similar to a conventional high resolution video output.

The invention may be implemented as a method, apparatus, computer-based system, programming executable on a computer, media executable on a computer and variations and combinations thereof. It will be appreciated that typical video systems include at least one video processor and associated memory from which instructions are retrieved for executing video processing steps and may be adapted to execute instructions which execute the method steps described herein. It should also be appreciated that the method of the present invention can be constituted in response to combinations of other forms of electronic hardware, as will be known to one of ordinary skill in the art.

In at least one mode of the invention, the second image source comprises a source of separate still images or frames from video images which have a lower temporal resolution than the first image source. In another aspect the generation of high spatial resolution video image utilizes one or more still images which are temporally displaced (representing a different time) from the frame of the high spatial resolution video image output.

The invention can be implemented in a number of different ways. In one implementation, the first and second image sources are received from separate imaging elements having a sufficiently coincident view wherein images from one of the sources can be used to enhance images from the other source. According to one implementation, the first image source comprises a higher temporal resolution mode of an imaging element, while the second image source comprises a lower temporal resolution mode of the imaging element. According to one implementation, the still images of the second image source have a higher native spatial resolution than the low resolution video source, wherein the images of the second image source are not created in response to combining multiple lower-resolution images into the still image.

In at least one mode of the invention, the SR signal is received as output from a super-resolution process which receives the first image source and processes them (merging and/or interpolation) into a higher spatial resolution SR signal output.

In at least one implementation of the invention the generation of the high resolution output, is performed within the transform-domain, such as in response to the use of a form of discrete cosine transform (DCT).

In at least one implementation the generation of high resolution output, comprises: (a) estimating motion between high spatial resolution images of the second image source and a temporal position for the high spatial resolution video image output of the method, wherein the estimation of motion is configured for generating at least one motion estimate in response to the first image source, the second image source, and the SR signal; (b) motion compensation of the second image source according to the motion estimates to provide a motion compensated image output; (c) forward transformation of the motion compensated output into a transform-domain motion compensated signal; (d) forward transformation of the SR signal into a transform-domain SR signal for the temporal position; (e) blending of content of the transform-domain motion compensated signal and the transform-domain SR signal to create a high spatial resolution signal in the transform-domain, with the blending being preferably performed according to a weighted sum and controlled in response to a measure of motion estimation error; and (f) inverse transformation of the high spatial resolution signal in the transform-domain into a high spatial resolution video image output with a spatial resolution exceeding the first image source and having a temporal resolution which exceeds the temporal resolution of the second image source.

In at least one mode or implementation of the invention, the blending is performed across multiple adjacent frames of the first image source. The blending process preferably includes (a) inputting an $SR_{DCTn}$ signal to the blending in which the $SR_{DCTn}$ results from a discrete cosine transform (DCT) which is applied to the SR image of the current time coinciding with the resultant (desired/target) high resolution image output. In at least one implementation, the blending is controlled by luma and chroma weighting vectors which regulate the blending of the discrete cosine transform (DCT) coefficients of the SR image with the DCT coefficients of the motion-compensated input images. In at least one implementation, blending utilizes weighting vectors which are preferably selected to retain low spatial resolution characteristics of the SR image, while introducing high spatial resolution characteristics from high spatial resolution inputs.

In at least one mode of the invention, motion is estimated (ME) according to a block-based process having fixed, or variable, block sizes. In one preferred implementation, the motion estimates (ME) are performed as a combination of chroma ME and luma ME. In one preferred implementation, motion estimates are obtained utilizing a search (e.g., full or partial) of low resolution motion estimation error outputs for possible motion vectors within a given area. In one aspect of motion estimates the motion estimate incorporates overlapped block motion estimation (OBME), and overlapped block motion compensation (OBMC) techniques.

In at least one implementation, thresholds are utilized for determining from which images the high spatial resolution information is to be extracted during the process of generating the high spatial resolution video image output. In at least one mode, the thresholds preferably comprise luma and/or chroma information and are based on motion estimation error values.

In one implementation, the invention comprises a method, programming executable on a computer, or a computer-readable media containing a computer program executable on a computer configured for processing video images and causing the computer to generate a high spatial resolution video image output, in response to steps, comprising: (a) receiving a first image source comprising video images of a first spatial and temporal resolution; (b) receiving a second image source comprising still images of a second spatial and temporal resolution, in which the first temporal resolution exceeds the second temporal resolution, while the second spatial resolution comprises a high spatial resolution which exceeds the first spatial resolution; (c) receiving super-resolved (SR) images within an SR signal, the SR signal resulting from processing one or more lower resolution video images according to a super-resolution or interpolation process which does not utilize images from the second image source; (d) estimating motion between high spatial resolution images of the second image source and a temporal position for the high spatial resolution video image output of the method; (e) the estimating motion configured to generate at least one motion estimate in response to the first image source, the second image source, and the SR signal; (f) motion compensation of the second image source according to the motion estimates to provide a motion compensated image output; (g) forward transformation of the motion compensated image output into a transform-domain motion compensated signal; (h) forward transformation of the SR signal into a transform-domain SR signal for the temporal position; (i) blending of content of the transform-domain motion compensated signal and the transform-domain SR signal to create a high spatial resolution signal in the transform-domain, in which the blending is preferably performed according to a weighted sum and controlled in response to a measure of motion estimation error; and (j) inverse transformation of the high spatial resolution signal in the transform-domain into a high spatial resolution video image output with a spatial resolution exceeding the first image source and having a temporal resolution which exceeds the temporal resolution of the second image source.

The invention provides numerous beneficial aspects for generating an output of high spatial and temporal resolution, as outlined below.

An aspect of the invention is the generation of a high resolution temporal and spatial video output in response to receiving a low spatial resolution video stream having a high temporal resolution, and high spatial resolution still images having a low temporal resolution.

Another aspect of the invention is the use of both a low and high spatial resolution image source which are sufficiently coincident (similar) with respect to image perspective.

Another aspect of the invention is the receipt of low and high spatial resolution image sources which are generated by the same video imaging element operating in different resolution modes.

Another aspect of the invention is the receipt of low and high spatial resolution image sources which are generated by different image elements having a sufficiently coincident (similar) image perspective.

Another aspect of the invention is the use of a super-resolved (SR) image input to the process in response to merging or interpolation of multiple low spatial resolution images for a given target frame time.

Another aspect of the invention is a blending process performed in the transform-domain.

Another aspect of the invention is a blending process in which motion estimation of low resolution images is utilized in combination with an SR signal and with one or more temporally displaced (from the target frame time) high resolution still images to create a resultant high resolution output.

Another aspect of the invention is a blending process in which the high resolution image source has a higher native spatial resolution than the low resolution video source and is not the result of combining multiple lower resolution images to create the still images.

Another aspect of the invention is a blending process which incorporates motion estimation.

Another aspect of the invention is a blending process, controlled by at least one motion estimation error measurement, which in response to receiving still image and SR image inputs generates a resultant high spatial resolution output.

Another aspect of the invention is a blending process which incorporates motion compensation.

Another aspect of the invention is a blending process which incorporates block transformation.

Another aspect of the invention is a blending process which incorporates measuring of motion estimation error (e.g., sum of absolute differences (SAD)) between image frames in the low resolution video toward minimization of target image error.

Another aspect of the invention is a blending process in which information from the low resolution SAD is used in the blending process when generating a target image output.

Another aspect of the invention is a blending process which executes an inverse transform of the blended output to create a resultant motion compensated high spatial resolution output.

Another aspect of the invention is a blending process which utilizes information across adjacent high spatial resolution frames to generate an output.

Another aspect of the invention is a blending process into which an $SR_{DCTn}$ signal is input, and wherein $SR_{DCTn}$ results from a transform (e.g., in this example case a discrete cosine transform (DCT)) applied to the SR image at a time coinciding with the desired temporal position of the resultant HR image output.

Another aspect of the invention is motion estimation (ME) during the blending process which is preferably block-based, having either fixed block sizes as described, or variable block sizing.

Another aspect of the invention is motion estimation (ME) performed as a combination of chroma ME and luma ME.

Another aspect of the invention is motion estimation (ME) which utilizes a search of motion estimation errors for possible motion vectors within a given area.

Another aspect of the invention is using SADs for finding motion estimation errors within a given area.

Another aspect of the invention is motion estimation (ME) which utilizes overlapped block motion estimation (OBME), and overlapped block motion compensation (OBMC) techniques.

Another aspect of the invention is a blending process which is controlled by luma and chroma weighting vectors.

Another aspect of the invention are the use of luma and chroma weighting vectors which control blending discrete cosine transform (DCT) coefficients of the SR image with the DCT coefficients of the motion-compensated input images.

Another aspect of the invention is the use of luma and chroma weighting vectors selected to retain low spatial resolution characteristics of the SR image, while introducing high spatial resolution characteristics from high spatial resolution inputs.

Another aspect of the invention is a blending process in which thresholds are utilized for selecting which high spatial resolution images, or weighting of contributions from these high spatial resolution images, are utilized in generating the desired high resolution image output.

Another aspect of the invention is to provide an apparatus or method which can be utilized within numerous video applications.

Another aspect of the invention is to provide an apparatus or method which can be utilized in video applications, including: consumer video cameras, still cameras, video surveillance systems, medical imaging, and so forth.

A still further aspect of the invention is the ability to implement the approach as an apparatus, method, programming executing on a computer, or as media containing programming executable on a computer.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
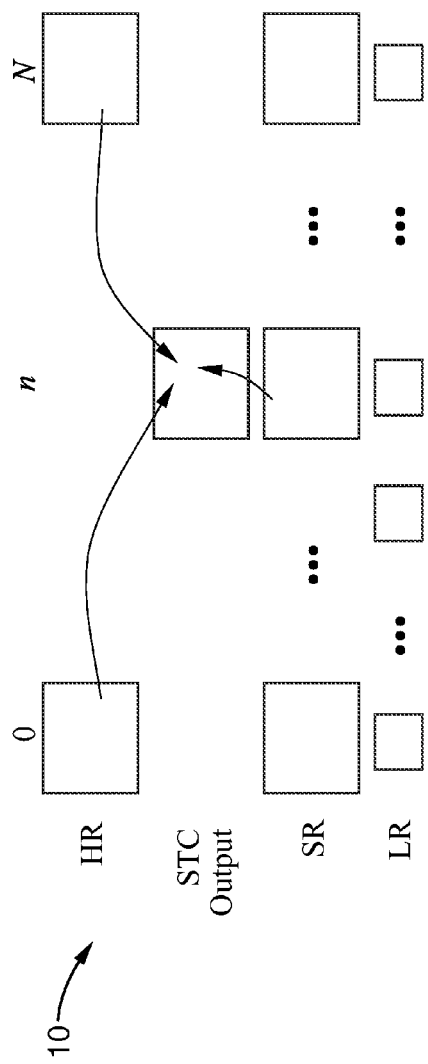
FIG. 1 is a data flow diagram of a video merging method (STC) according to an embodiment of the present invention, showing multiple pictures being combined, such as including temporally displaced high resolution stills to the left (earlier frames) and/or right (later frames).

Referring more specifically to the drawings, for illustrative purposes the present invention is embodied in the apparatus and methods generally shown in FIG. 1 through FIG. 7. It will be appreciated that the apparatus may vary as to configuration and as to details of the parts, and that the method may vary as to the specific steps and sequence, without departing from the basic concepts as disclosed herein.

1. Introduction

A method and apparatus is described for merging lower resolution video with high-resolution still images. The invention is preferably implemented as programming executable on a computer configured for processing video streams and executing video algorithms. The result of the inventive method is a high-resolution video frame generated at a time different than that of the received high-resolution still images (temporally separated). This overall process is referred to herein as shutter time compensation (STC), and the combining of the images as STC picture blending.

The embodiments are described herein according to a luminance-chrominance (luma-chroma) color space, such as YUV, or YCrCb, with a given color subsampling of 4:2:0. Accordingly, the descriptions refer to Y (luma) and Cb and Cr (chroma) which are subsampled 2:1 in each spatial dimension relative to luma. However, embodiments of the present invention can be equally applied to any other desired color spaces, such as RGB, and to other subsampling schemes, such as 4:2:2; 4:4:4 and so forth.

A measure of motion estimation error is described herein as being sum of absolute differences (SAD). It should be appreciated, however, that metrics other than SAD can be readily applied without departing from the teachings herein. By way of example and not limitation these techniques include sum of squared errors (SSE), mean squared error (MSE), or the use of cross-correlation, sum of absolute transform differences (SATD), and numerous others as will be recognized by one of ordinary skill in the art.

The lower-resolution video and high-resolution still images preferably are received from the same acquisition device, yet have different spatial and temporal resolutions. Alternatively, though generally less preferably (e.g., more costly), the still images and video images can be obtained from different imaging elements which have a sufficiently coincident view, that is they share a similar image perspective (e.g., co-axial, adjacent, or otherwise sufficiently close) so that image data from one can be used to enhance image data from the other. The video source is configured to provide a higher temporal resolution and lower spatial resolution; it can be equally said that the still images have higher spatial resolution but lower temporal resolution. By considering the motion among the low-resolution video frames, the method creates a shutter-time compensated video frame that contains the high-resolution characteristics of the high-resolution images compensated to a different time. In using the method the high-resolution output that would have been observed if the high-resolution acquisition time were coincident with the video frame under consideration is simulated.

It should be appreciated that the temporally decimated high spatial resolution image source is configured to provide a higher native spatial resolution than that provided by the low resolution video source. The high resolution stills are received from a higher spatial resolution source and are thus not the result of combining multiple lower resolution images to create the still images. It will be appreciated that the lower resolution images are used to create the SR signal which is used in combination with the temporally sparse high resolution images to create the frames of high spatial resolution video output.

An embodiment of the invention utilizes another input, referred to herein as the super-resolved (SR) input; although the method of creating the SR input is not generally discussed herein. The SR input is generated in response to processing lower-resolution video frames to produce a higher-resolution image signals. The SR method, however, teaches utilizing the information present in the lower-resolution video frames and does not teach blending the high-resolution still information to increase the accuracy of the video output. The present STC picture blending invention utilizes the SR output in two ways: (1) To estimate motion with higher precision than possible with the original low-resolution pictures; and (2) to prevent artifacts from occurring in the final output.

By way of example, and not limitation, the teachings herein are in reference to an SR input generated by a process described in another invention by the inventive entity. However, it is to be recognized that the algorithms taught herein can utilize an "SR input" which has been generated by any desired method. Utilization of the techniques herein, do not even require that the SR input be generated using traditional multi-frame super-resolution methods, as it may generated by interpolation or combination of techniques. The SR input picture represents a higher-resolution version of the original low-resolution input picture, where the conversion to higher resolution can be provided by any available technique insofar as that method only makes use of the low-resolution input pictures. Thus, the SR input picture could be provided through traditional multi-frame super-resolution methods, or it could come from other types of sophisticated upsampling, such as edge-adaptive interpolation, and so forth. Therefore, it should be clearly understood that the teachings of the present invention can be implemented across a wide range of sources for the SR input without limitation thereof.

2. Video Merging Method

FIG. 1 illustrates an embodiment 10 of the blending method according to the invention, showing creation of a single high-resolution image temporally displaced between two still images. To determine the STC output at the desired time n, the method combines multiple pictures, this example illustrating the use of up to three pictures: (1) a high-resolution still to the left (prior time/frame) ($HR_0$), (2) a high-resolution still to the right (later time/frame)($HR_N$), and (3) the super-resolved image for the desired time (current frame being assembled)($SR_n$). The method also utilizes the original low-resolution (LR) video frames for determining SAD values. Alternatively, the method can be configured to combine either the high-resolution still to the left ($HR_0$) or right ($HR_N$) with ($SR_n$). It should be noted that input ($SR_n$) can be any desired "higher-resolution" ("SR input"), and need not necessarily be generated by a multi-frame super-resolution algorithm.

Figure 2:
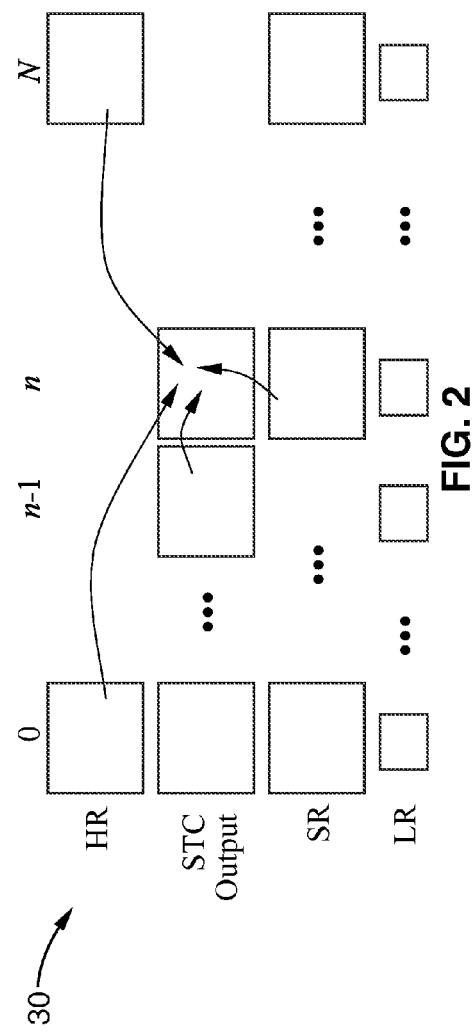
FIG. 2 is a data flow diagram of the video merging method (STC) shown in FIG. 1 which makes use of the previous STC output at time n−1.

FIG. 2 illustrates an embodiment 30 which extends the STC picture blending method to each frame of the sequence. The primary difference with FIG. 1 is that the method is configured to make use of the previous STC output at time n−1, when determining the STC output for time n.

The inventive method is sufficiently generic that not all four of the example inputs need to be utilized. For example, some applications may only have a single HR input, and only require a single STC output at a particular time. In such a case, the method can be readily configured to combine just $HR_0$ and $SR_n$ when forming the STC output.

The following discussion centers on the procedure for the case of FIG. 2, in relation to which the case of FIG. 1 can be generally considered a simplified subset of that which is taught for FIG. 2.

Figure 3:
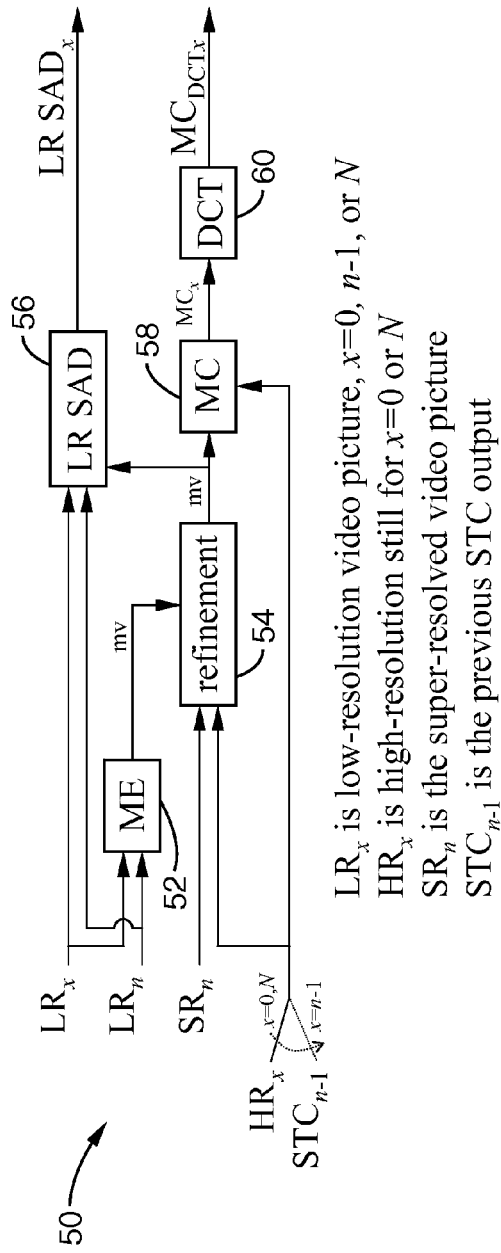
FIG. 3 is a schematic of an apparatus for performing the STC according to an aspect of the present invention.

FIG. 3 illustrates an embodiment 50 of a procedure that can be applied to the high-resolution inputs toward generating an enhanced spatial resolution shutter-time compensated video output. It should be appreciated that the procedural elements can be embodied as a method, or within an apparatus such as programming executable on a computer configured for processing video images, or as a computer readable media containing programming executable on a computer configured for processing video images, or as combinations and variations thereof.

The high resolution inputs shown in FIG. 3 do not represent the desired image frame (shutter-time compensated frame), thus they can be said to be shutter times that are temporally displaced from that of the high resolution video image to be output. In the present case, these three high-resolution inputs are $HR_0$, $HR_N$, and $STC_{n-1}$. First, the method performs motion estimation (ME) 52 on the low-resolution (LR) frames. Then the LR motion results are utilized as initial conditions for a high-resolution motion refinement 54. The high-resolution motion refinement uses the SR frame at the current time, and the high-resolution input as a reference frame. Using these higher-resolution pictures allows final motion estimation results to have higher precision compared to motion estimation which uses only the low resolution pictures. The LR SAD 56 uses the higher-precision motion vectors (mv) from motion refinement 54 to compute metrics of motion vector quality, based on comparisons of the original LR frames. Motion compensation (MC) 58 uses the motion vectors from motion refinement 54 to produce high-resolution estimates of the present image frame based on the original high-resolution inputs. A discrete cosine transform (DCT) 60 is then applied (e.g., on 8×8 blocks for the luma, and 4×4 blocks for the chroma when using 4:2:0 color sampling) to the motion-compensated high-resolution frame. The two outputs shown in FIG. 3 are the sum-of-absolute-differences (SADs) from the low-resolution video frames, and the DCT of the motion-compensated high-resolution inputs.

One of ordinary skill in the art will appreciate that SADs are a widely utilized and simple video quality metric used for block-matching during the motion estimation process. SAD operates by taking the absolute value of the difference between each pixel in the original block and the corresponding pixel in the block being used for comparison, and summing these differences to create a simple metric of block similarity.

Although, development of motion estimation mechanisms is not a focus for this application, some discussion of motion estimation in these embodiments may aid in explaining the overall STC picture blending method. Motion estimation (ME) as exemplified herein is block-based with fixed block sizes, and it considers both luma (luminance) and chroma (chrominance). By way of example, and not limitation, motion estimation utilizes full search, where for instance it evaluates SADs for all possible motion vectors in the rectangular search region. The method steps then preferably utilize overlapped block motion estimation (OBME) and overlapped block motion compensation (OBMC). The motion refinement at the higher resolution refines the results from the lower resolution by searching ±1 pixel, plus a sub-pixel search. It will be noted that the ME process can significantly slow the execution of the STC picture blending method. It should be appreciated that motion refinement is part of the overall motion estimation process, whose results are the motion vectors. Details of the motion estimation process are discussed in more depth in later sections of this application. It should also be noted that improving motion estimation, such as by incorporating fast-search techniques, and/or variable block sizes, and so forth, can improve the speed and/or quality of the STC picture blending method. For example, utilizing fast-search techniques would be expected to improve the speed of operation, while the use of variable block sizes may slightly decrease speed but potentially improve quality of motion.

Figure 4:
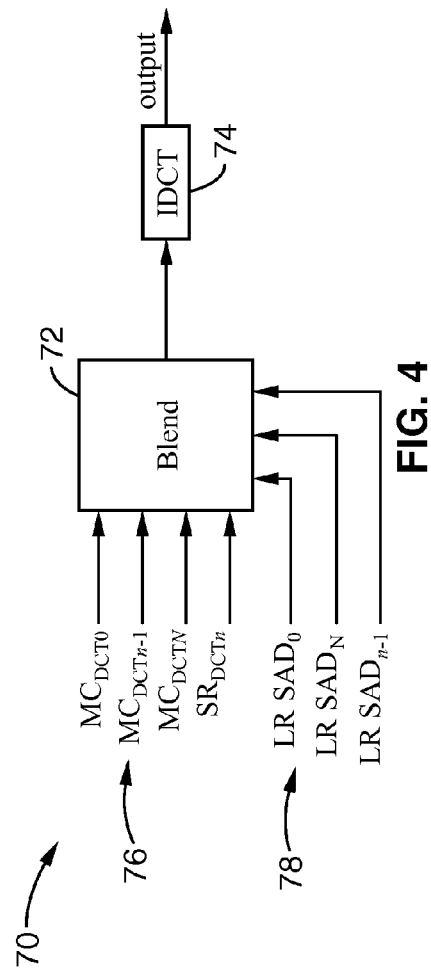
FIG. 4 is a schematic of an apparatus for combining all high-resolution images according to an aspect of the present invention.

FIG. 4 illustrates an embodiment 70 of a blender which combines all high-resolution images, such as those received from the outputs of FIG. 3, into a single output. The figure depicts a blending block 72 followed by an inverse-discrete cosine transform (IDCT) block 74 in response to receipt of high resolution MC images 76 and low resolution SAD data 78. The procedure in FIG. 3 is applied to each high-resolution input and the outputs are used as inputs to the module, or process step, shown in FIG. 4. It should be noted that an additional high resolution source is present in FIG. 4 as given by $SR_{DCTn}$, which is the DCT applied to the SR image at the current time n.

Despite simplified assertions made herein about the blending operation, it should be appreciated that high resolution (HR) MC images are not actually blended with SAD data, as it is the HR MC images which are blended with the SR image. The ME error information (SAD data) is used for controlling the blending. As can be seen in the figure, the high resolution pictures (motion compensated HR pictures at 0 and N, motion compensated previous output at n−1, and SR input at current time) are shown as inputs 76, with the LR SAD data 78 shown as information received by the blender to control the blending process.

It should be appreciated that not all inputs need be received and/or used by the blender, though there must be some blending (or combination of inputs) prior to the IDCT process. As an example of fewer inputs, if only $HR_0$ is used for the high-resolution inputs, then inputs for $MC_{DCTn-1}$ and $MC_{DCTn}$ would not be blended. The "Blend" block 72 of FIG. 4 performs as shown in the code below for a particular 8×8 block:

Code INPUTS

```
// Variables of form ?_Y relate to luminance component
// Variables of form ?_Cr, or ?_Cb relate to chrominance components
LR SADs for Y, Cb, and Cr for HR images 0 and N:
    SAD_Y_x, SAD_Cb_x, SAD_Cr_x, x = 0, N
LR SADs for Y, Cb, and Cr for the previous STC output:
    SAD_Y_{n-1}, SAD_Cb_{n-1}, SAD_Cr_{n-1}
DCT of motion compensated versions of HR images 0 and N:
    MC_{DCT0} and MC_{DCTN}
DCT of motion compensated previous STC output:
    MC_{DCTn-1}
DCT of super-resolved image:
    SR_{DCTn}
Thresholds T_y and T_{yn} for luma, and T_c and T_{cn} for chroma
weight_Y[8], a vector of weights for DCT coefficient of luma
weight_C[4], a vector of weights for DCT coefficient of chroma
```

Code OUTPUTS

Output image, in the DCT domain

Example Section of Code

```
BEGIN:
if (SAD_Y_0 + SAD_Cb_0 + SAD_Cr_0 <= SAD_Y_N + SAD_Cb_N +
SAD_Cr_N)
{
    if ( (SAD_Y_0 < T_y) && (SAD_Cb_0 < T_c) && (SAD_Cr_0 < T_c) )
    {
        HRin_Y = Y component of MC_{DCT0} ;
        HRin_Cb = Cb component of MC_{DCT0} ;
        HRin_Cr = Cr component of MC_{DCT0} ;
    } else if ((SAD_Y_{n-1} < T_{yn}) && (SAD_Cb_{n-1} < T_{cn}) &&
    (SAD_Cr_{n-1} < T_{cn}))
    {
        HRin_Y = Y component of MC_{DCTn-1} ;
        HRin_Cb = Cb component of MC_{DCTn-1} ;
        HRin_Cr = Cr component of MC_{DCTn-1} ;
    } else
    {
        HRin_Y = Y component of SR_{DCTn} ;
        HRin_Cb = Cb component of SR_{DCTn} ;
        HRin_Cr = Cr component of SR_{DCTn} ;
    }
} else
{
    if ( (SAD_Y_N < T_y) && (SAD_Cb_N < T_c) && (SAD_Cr_N < T_c) )
    {
        HRin_Y = Y component of MC_{DCTN} ;
        HRin_Cb = Cb component of MC_{DCTN} ;
        HRin_Cr = Cr component of MC_{DCTN} ;
    } else if((SAD_Y_{n-1} < T_{yn}) &&
    (SAD_Cb_{n-1} < T_{cn}) && (SAD_Cr_{n-1} < T_{cn}))
    {
        HRin_Y = Y component of MC_{DCTn-1} ;
        HRin_Cb = Cb component of MC_{DCTn-1} ;
        HRin_Cr = Cr component of MC_{DCTn-1} ;
    } else
    {
        HRin_Y = Y component of SR_{DCTn} ;
        HRin_Cb = Cb component of SR_{DCTn} ;
        HRin_Cr = Cr component of SR_{DCTn} ;
    }
}
for (i=0; i<8; i++)
{
    for (j=0; j<8; j++)
    {
        out_Y[i][j] = (1.0-weight_Y[i]*weight_Y[j]) * HRin_Y[i][j] +
                    weight_Y[i]*weight_Y[j] * SR_{DCTn}_Y[i][j];
    }
}
for (i=0; i<4; i++)
{
    for (j=0; j<4; j++)
    {
        out_Cb[i][j] = (1.0-weight_C[i]*weight_C[j]) *
        HRin_Cb[i][j] +
                    weight_C[i]*weight_C[j] * SR_{DCTn}_Cb[i][j];
        out_Cr[i][j] = (1.0-weight_C[i]*weight_C[j]) * HRin_Cr[i][j] +
                    weight_C[i]*weight_C[j] * SR_{DCTn}_Cr[i][j];
    }
}
END:
```

In at least one embodiment, thresholds (e.g., based on SAD) determine which images (e.g., based on luma and/or chroma information) should be utilized (i.e., extracted from, blended) when generating the high resolution video image output. It will be appreciated that under certain conditions the content of certain still images may not sufficiently approximate the shutter time compensated frame despite close temporal proximity. Consider for example the simple example of a scene change arising between a still image and a subsequent target high resolution image frame. At least one embodiment of the method is configured for utilizing images on either side of the shutter-time compensated (target time) high resolution image frame, should discontinuities or noise arise. In at least one embodiment, the thresholds are utilized for determining what extent each of the input high spatial resolution images are to contribute to the target image being generated.

By way of example and not limitation, the thresholds $T_y$ and $T_c$ can be utilized to ensure that the motion-compensated HR images are preferably used when a sufficient match (e.g., measured in relation to the thresholds) arises (according to SAD) with the original LR video frames. If the SADs for the HR inputs are not less than the thresholds, then the thresholds $T_{yn}$ and $T_{cn}$ allow the motion-compensated previous STC output to be used when there is a sufficient match (according to SAD) in the original LR video frames. If the SADs for the HR images and the previous STC output are too high, then the algorithm chooses the SR image.

The vectors of weights weight_Y and weight_C control how to blend the DCT coefficients of the SR image with the DCT coefficients of the motion-compensated input images (HRin_Y, HRin_Cb, and HRin_Cr). The weights are chosen such that the low-resolution characteristics of the SR image are retained, while the high-resolution characteristics of the other image inputs are introduced.

Figures 5A, 5B, 6A, 6B, 6C:
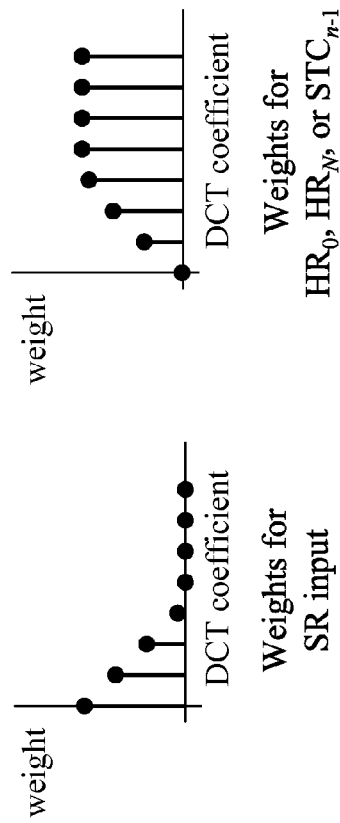
FIG. 5A-5B are graphs of DCT coefficient weighting for SR input (FIG. 5A) and for $HR_0$, $HR_N$, or $STC_{n-1}$ (FIG. 5B).
FIG. 6A-6C are matrices illustrating example weighting according to an aspect of the present invention, showing an example 8×8 block size matrix.

FIGS. 5A and 5B illustrate example weighting. It will be appreciated that the weights for the SR image should be low-pass in nature as shown in FIG. 5A, while the weights for the HR image should be high-pass in nature as shown in FIG. 5B.

Table 1 illustrates two sets of sample weights which have provided sufficiently reasonable results to serve as a proof of concept for the present invention. For the present example, the resolution difference between LR and HR is a factor of two in each dimension. If resolution differences between LR and HR are larger than two, then these weights should be adjusted accordingly. Note that in the example there are only four weights for chroma, since the chroma planes have half the width and height as the luma planes. After blending, such as per FIG. 4, the inverse DCT yields the final STC output.

Motion estimation for the present invention is discussed in the following sections. Particular characteristics of block-based motion estimation as described herein include: (a) overlapped block motion estimation (OBME); (b) overlapped block motion compensation (OBMC); and (c) using both luma and chroma in SAD computation; which are each described in succeeding sections.

3. Overlapped Block Motion Estimation

Before concluding, the following discusses the process of overlapped block motion estimation, in which the SAD is computed for the current B×B block. It will be appreciated that not only the $B^2$ pixel differences of the block are summed with the reference block, but also additional pixels are summed outside of the block. For example, suppose the "traditional" SAD is computed as follows:

$$SAD[n, m, mvx, mvy] = \sum_{i=0}^{B-1} \sum_{j=0}^{B-1} |CUR[n+j, m+i] - REF[n+mvx+j, m+mvy+i]|,$$

where n and m are the pixel positions of the current block, mvx and mvy are the candidate motion vectors, and CUR and REF are the current and reference images. The OBME SAD for the same B×B block would be modified as $$SAD_{OBME}[n, m, mvx, mvy] = \sum_{i=-K}^{B+K-1} \sum_{j=-K}^{B+K-1} |CUR[n+j, m+i] - REF[n+mvx+j, m+mvy+i]|,$$

wherein the summation is performed over a larger area.

In simulations performed for the embodiments of the present invention, a value of B=4, and K=B/2 is typically used in the LR images, and B=8 and K=B/2 in the HR images.

4. Overlapped Block Motion Compensation

The term overlapped block motion compensation, as used herein refers to motion-compensated prediction formed by a weighted sum of several blocks. The blocks that are weighted and summed are as follows, where x and y are the block indices for a frame:

(a) The block at position (x,y) translated according to the motion vector at block position (x,y). (This corresponds to the "traditional" motion compensated prediction.)

(b) The block at position (x,y) translated according to the motion vector at block position (x,y−1).

(c) The block at position (x,y) translated according to the motion vector at block position (x,y+1).

(d) The block at position (x,y) translated according to the motion vector at block position (x−1,y).

(e) The block at position (x,y) translated according to the motion vector at block position (x+1,y).

The precise nature of the weighting depends on the block size. The weighting is based on the weighting described in Annex F (Advanced Prediction Mode) of the H.263 video compression standard.

FIG. 6A-6C illustrate example weighting for 8×8 block sizes. FIG. 6A depicts weighting for blocks translated by the motion vector at (x,y). FIG. 6B depicts weights for blocks corresponding to motion vectors from horizontal neighbors, while FIG. 6C depicts weights for blocks corresponding to motion vectors from vertical neighbors.

For the 8×8 example above, the right-most 4×8 part of the horizontal weighting matrix corresponds to the prediction with the motion vector at (x+1,y), the left-most 4×8 part of the horizontal weighting matrix corresponds to the prediction with the motion vector at (x−1,y), the upper 8×4 part of the vertical weighting matrix corresponds to the prediction with the motion vector at (x,y−1), and the lower 8×4 part of the vertical weighting matrix corresponds to the prediction with the motion vector at (x,y+1). The weights are selected so that after the weighted sum is performed, the normalization can be readily accomplished, such as by utilizing a right shift of three bits.

Using OBMC provides advantages, including: (a) smoothing blocking artifacts, (b) preventing discontinuities of image edges in response to small differences in motion vectors arising between neighboring blocks. Although OBMC can provide the above advantages, it sometimes slightly blurs image detail. For example, in areas where motion is estimated well, OBMC will not cause any blurring, yet when motion is poorly estimated the image content can be blurred. In testing OBMC against normal motion compensation it was found that fewer artifacts were introduced and the output was more visually pleasing.

5. Using Both Luma and Chroma for SAD Computation

In at least one embodiment of the invention, motion estimation (ME) is performed with both chroma and luma ME. It will be appreciated that chroma ME in concert with luma ME is seldom utilized during video compression, because only negligible improvements in rate-distortion are provided while the process involves higher ME complexity. In video compression, a prediction residual can correct for occasional errors in motion estimation. However, it has been found for the present invention, that errors arising during motion estimation can lead to generation of significant artifacts. The present invention preferably utilizes chroma ME in addition to luma ME to thus prevent chroma artifacts arising in the shutter-time compensated (STC) HR output images.

In considering 4:2:0 line color subsampling, the luma resolution is double that of the chroma resolution in both horizontal and vertical dimensions. Thus, when the SAD is computed for a block, each chroma SAD will cover one-fourth as many pixels as the luma SAD covers. If desired, the weight of the chroma SAD can be increased to account for the lower resolution of chroma.

6. Application Examples

Figure 7:
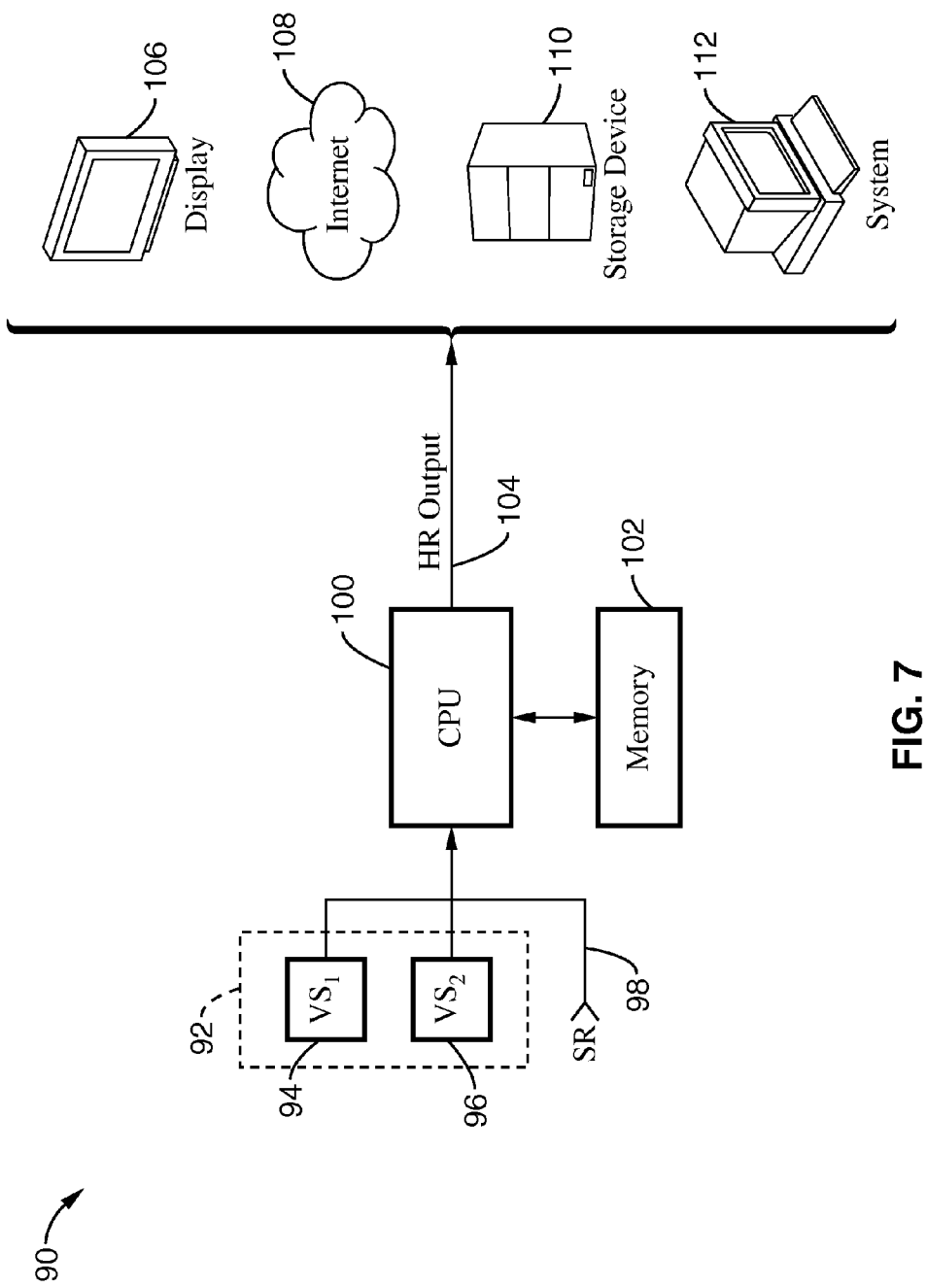
FIG. 7 is a block diagram of a system configured for generating high spatial resolution output according to an embodiment of the present invention.

FIG. 7 illustrates an example embodiment 90 of an imaging system configured for generating a high spatial resolution output according to the present invention. An image source 92 is shown comprising a first image source 94 and second image source 96. In a preferred embodiment, the first and second image source differ in spatial and temporal resolution (e.g., one source providing temporally sparse high resolution images and the other being a low resolution video image source).

Output from these image sources is received in combination with an SR signal 98 by a computer 100 (e.g., CPU, microprocessor, DSP, ASIC containing a processor core, and so forth) which has access to memory 102 from which instructions are executed for performing the method according to the present invention and generating a high resolution output 104 having a high spatial resolution.

It should be appreciated that memory 102 can comprise any desired form of memory and combination thereof, into which executable instructions may be received for processing by computer 100, such as internal semiconductor memory (e.g., SRAM, DRAM, FLASH, ROM, and so forth), as well as receiving information from external memory sources including semiconductor memories and media devices.

The high resolution output can be utilized in a similar manner as any conventional high resolution image output, shown by way of example are a display 106, a communication path 108 (e.g., communicating over a network such as the Internet), stored in a storage device 110 (e.g., for later use), received for use by another system or systems 112, and/or utilized in other ways in a manner similar to that of any conventional high resolution video output.

It should be appreciated, that the present invention may be applied to a number of different applications. In general, any application in which low-update high-resolution images are available in combination with high-update lower-resolution video provide an appropriate platform upon which the present invention can be implemented. One such example is use of a camera for capturing single high-resolution pictures, and using the camera to then resample the high-resolution pictures into lower-resolution video frames. In this example, bandwidth availability may allow storage of the full video, but only periodic storage of the high-resolution pictures. Similarly, perhaps the high-resolution picture is only stored on-demand, when the user wishes to capture a high-resolution snapshot during video capture. In either case, if it is desired to have high-resolution pictures at times not perfectly coincident with those of the captured high-resolution pictures, the present invention can compensate for the time mis-match by propagating the high-resolution data to the desired time. This was a primary motivation for the term "shutter-time compensation" (STC).

The previous application example was described for use in systems that capture high-resolution pictures, and through processing would also produce low-resolution pictures. Another application area is for separate capture devices which share a common point of view, for example a high resolution still camera combined with a separate lower-resolution video camera. After a pre-processing step registers the pictures to compensate for any misalignment, the present invention allows a user to combine high-resolution stills and low-resolution video to produce a high-resolution image at moments for which no original high-resolution pictures were available.

It will be appreciated that alternative applications and combinations exist to which the teachings of the invention can be applied.

7. Strengths of the Inventive Method

The method of the invention has been found to have a number of strengths, including the following. Utilizing SADs of the low-resolution video frames provides increased selection of the appropriate high-resolution inputs than utilizing SADs of the high-resolution data. For example, consider the case of a large SAD between $SR_n$ and $HR_0$. It is possible that the large SAD arises in response to a ill-fitting motion match. It is equally possible that the motion match was appropriate, yet the large SAD is in response to sharp edges of $HR_0$ matching to blurry edges of $SR_n$. Using the SAD from the low-resolution video frame helps to resolve this ambiguity.

Retaining the low-frequency component of the SR image according to the invention, also does an excellent job of preventing artifacts from arising in the STC output. Artifact prevention is particularly evident in the following situations: (a) when lighting changes arise between $HR_0$ and $HR_N$, retaining the low-frequency component of the SR image ensures that the frame-to-frame changes in lighting of the STC output match those of the SR input; (b) sometimes the SAD is small, even though the motion is incorrect; wherein retaining the low-frequency component of the SR image reduces the impact of incorrect motion matches.

Areas that have been considered for additional enhancement include the following. This invention makes use of the DCT for combining low-frequency characteristics of the SR images with the high-frequency characteristics of the HR images. The use of DCT is convenient because it can be applied locally on blocks, which is computationally expedient. However, it will be appreciated that other transform domains exist which may be alternatively, or additionally, utilized. Example transforms that share similarities with the DCT include: Sine Transform, Hadamard Transform, Slant Transform, Karhunen-Loève Transform, and the Fourier Transform. Another example is a wavelet or sub-band decomposition of the input images with respect to each of the various frequency bands. This approach may provide more flexibility within the method, although it may be less computationally convenient.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, and functional equivalents to the elements of the above-described preferred embodiment that are known to those of ordinary skill in the art are expressly incorporated herein by reference and are intended to be encompassed by the present claims. Moreover, it is not necessary for a device or method instance to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Two Sets of Sample Weights for Luma and Chroma

| Coefficient Index | weight_Y | weight_C | weight_Y | weight_C |
|---|---|---|---|---|
| 0 | 1.000 | 1.000 | 1.000 | 1.000 |
| 1 | 0.750 | 0.500 | 0.667 | 0.333 |
| 2 | 0.500 | 0.000 | 0.333 | 0.000 |
| 3 | 0.250 | 0.000 | 0.000 | 0.000 |
| 4 | 0.000 | X | 0.000 | X |
| 5 | 0.000 | X | 0.000 | X |

TABLE 1-continued

Two Sets of Sample Weights for Luma and Chroma

| Coefficient Index | weight_Y | weight_C | weight_Y | weight_C |
|---|---|---|---|---|
| 6 | 0.000 | X | 0.000 | X |
| 7 | 0.000 | X | 0.000 | X |

What is claimed is:

1. A method of generating a shutter-time compensated high spatial resolution video image output, comprising:
receiving a first image source comprising video images of a first spatial and temporal resolution;
receiving a second image source comprising still images of a second spatial and temporal resolution;
wherein said first temporal resolution exceeds said second temporal resolution, while said second spatial resolution comprises a high spatial resolution which exceeds said first spatial resolution;
receiving super-resolved (SR) images within an SR signal, said SR signal resulting from processing one or more lower resolution video images from said first image source according to a super-resolution or interpolation process which does not utilize images from said second image source; and
generating a shutter-time compensated high spatial resolution video image output in response to transform-domain blending between the SR signal and motion compensation of said second image source, with said blending performed in response to a measure of motion estimation error.

2. A method as recited in claim 1, wherein said second image source comprises a source of separate still images or frames from video images having a lower temporal resolution than said first image source.

3. A method as recited in claim 2, wherein said generating of said shutter-time compensated high spatial resolution video image utilizes one or more still images which are temporally displaced from the frame of said shutter-time compensated high spatial resolution video image output.

4. A method as recited in claim 1, wherein said first and second image sources are received from separate imaging elements having a sufficiently coincident view wherein images from one of the sources can be used to enhance images from the other source.

5. A method as recited in claim 1, wherein said first image source comprises a higher temporal resolution mode of an imaging element, while said second image source comprises a lower temporal resolution mode of said imaging element.

6. A method as recited in claim 1, wherein said still images of said second image source have a higher native spatial resolution than the low resolution video source, wherein the images of said second image source are not created in response to combining multiple lower-resolution images into said still image.

7. A method as recited in claim 1, wherein receiving of said SR signal comprises:
receiving said first image source into a super-resolution process; and
generating an SR signal within said super-resolution process in response to merging multiple video images from said first image source into a higher spatial resolution SR signal output.

8. A method as recited in claim 1, wherein said transform-domain blending is performed in response to using a form of discrete cosine transform (DCT).

9. A method as recited in claim 1, wherein said generating of a shutter-time compensated high spatial resolution video image output, comprises:
estimating motion between high spatial resolution images of said second image source and a temporal position for the shutter-time compensated high spatial resolution video image output of said method;
wherein said step of estimating motion generates at least one motion estimate in response to said first image source, said second image source, and said SR signal;
performing motion compensation of said second image source according to said motion estimates to provide a motion compensated image output;
performing forward transformation of said motion compensated image output into a transform-domain motion compensated signal;
performing forward transformation of said SR signal into a transform-domain SR signal for said temporal position;
performing blending of content of said transform-domain motion compensated signal and said transform-domain SR signal to create a high spatial resolution signal in the transform-domain;
said blending performed according to a weighted sum and controlled in response to a measure of motion estimation error; and
performing inverse transformation of said high spatial resolution signal in the transform-domain into a shutter-time compensated high spatial resolution video image output with a spatial resolution exceeding said first image source and having a temporal resolution which exceeds the temporal resolution of said second image source.

10. A method as recited in claim 9, wherein said blending is performed across multiple adjacent frames of said first image source.

11. A method as recited in claim 9, further comprising:
inputting an $SR_{DCT_n}$ signal to said blending; and
wherein said $SR_{DCT_n}$ results from a discrete cosine transform (DCT) applied to said SR image of the current time coinciding with said shutter-time compensated high resolution image output.

12. A method as recited in claim 9, wherein said estimating of motion (ME) is block-based with fixed, or variable, block sizes.

13. A method as recited in claim 9, wherein said estimating of motion (ME) is performed as a combination of chroma ME and luma ME.

14. A method as recited in claim 9, wherein said estimating of motion utilizes a search of low resolution motion estimation error outputs for possible motion vectors within a given area.

15. A method as recited in claim 14, wherein said estimating of motion incorporates overlapped block motion estimation (OBME), and overlapped block motion compensation (OBMC) techniques.

16. A method as recited in claim 9, wherein said blending is controlled by luma and chroma weighting vectors which control blending discrete cosine transform (DCT) coefficients of the SR image with the DCT coefficients of the motion-compensated input images.

17. A method as recited in claim 16, wherein said weighting vectors are selected to retain low spatial resolution characteristics of the SR image, while introducing high spatial resolution characteristics from high spatial resolution inputs.

18. A method as recited in claim 1, wherein said method is implemented as programming executable on a computer configured for processing video streams and executing video algorithms.

19. A method as recited in claim 1, further comprising thresholds for determining from which images high spatial resolution information is extracted during the process of generating said shutter-time compensated high spatial resolution video image output.

20. A method as recited in claim 19:
wherein said thresholds comprise luma and/or chroma information; and
wherein said thresholds are based on motion estimation error values.

21. A method of generating a shutter-time compensated high spatial resolution video image output, comprising:
receiving a first image source comprising video images of a first spatial and temporal resolution;
receiving a second image source comprising still images of a second spatial and temporal resolution;
wherein said first temporal resolution exceeds said second temporal resolution, while said second spatial resolution comprises a high spatial resolution which exceeds said first spatial resolution;
receiving super-resolved (SR) images within an SR signal, said SR signal resulting from processing one or more lower resolution video images from said first image source according to a super-resolution or interpolation process which does not utilize images from said second image source;
estimating motion between high spatial resolution images of said second image source and a temporal position for the high spatial resolution video image output of said method;
wherein said step of estimating motion generates at least one motion estimate in response to said first image source, said second image source, and said SR signal;
performing motion compensation of said second image source according to said motion estimates to provide a motion compensated image output;
performing forward transformation of said motion compensated image output into a transform-domain motion compensated signal;
performing forward transformation of said SR signal into a transform-domain SR signal for said temporal position;
performing blending of content of said transform-domain motion compensated signal and said transform-domain SR signal to create a high spatial resolution signal in the transform-domain;
said blending performed according to a weighted sum and controlled in response to a measure of motion estimation error; and
performing inverse transformation of said high spatial resolution signal in the transform-domain into a shutter-time compensated high spatial resolution video image output with a spatial resolution exceeding said first image source and having a temporal resolution which exceeds the temporal resolution of said second image source.

22. A non-transitory computer-readable media containing a computer program executable on a computer configured for processing video images and causing the computer to generate a shutter-time compensated high spatial resolution video image output, in response to steps, comprising:
receiving a first image source comprising video images of a first spatial and temporal resolution;
receiving a second image source comprising still images of a second spatial and temporal resolution;
wherein said first temporal resolution exceeds said second temporal resolution, while said second spatial resolution comprises a high spatial resolution which exceeds said first spatial resolution;
receiving super-resolved (SR) images within an SR signal, said SR signal resulting from processing one or more lower resolution video images from said first image source according to a super-resolution or interpolation process which does not utilize images from said second image source; and
generating a shutter-time compensated high spatial resolution video image output in response to transform-domain blending between the SR signal and motion compensation of said second image source, with said blending performed in response to a measure of motion estimation error.

23. An apparatus configured for generating a shutter-time compensated high spatial resolution video image output, comprising:
a computer configured for processing sequences of images; and
programming executable on said computer for,
receiving a first image source comprising video images of a first spatial and temporal resolution,
receiving a second image source comprising still images of a second spatial and temporal resolution,
wherein said first temporal resolution exceeds said second temporal resolution, while said second spatial resolution comprises a high spatial resolution which exceeds said first spatial resolution,
receiving super-resolved (SR) images within an SR signal, said SR signal resulting from processing one or more lower resolution video images from said first image source according to a super-resolution or interpolation process which does not utilize images from said second image source, and
generating a shutter-time compensated high spatial resolution video image output in response to transform-domain blending between the SR signal and motion compensation of said second image source, with said blending performed in response to a measure of motion estimation error.

* * * * *